(12) United States Patent
Krishnasamy et al.

(10) Patent No.: US 8,260,461 B2
(45) Date of Patent: Sep. 4, 2012

(54) METHOD AND SYSTEM FOR ROBOT CALIBRATIONS WITH A CAMERA

(75) Inventors: Sekar Krishnasamy, Karnataka (IN); Vijay Sakhare, Bangalore (IN); Mordechai Leska, Rishon Le-Zion (IL); Donald Foldenauer, San Jose, CA (US); Rinat Shimshi, San Jose, CA (US); Satish Sundar, Karnataka (IN)

(73) Assignee: Applied Materials, Inc., Santa Clara, CA (US)

( * ) Notice: Subject to any disclaimer, the term of this patent is extended or adjusted under 35 U.S.C. 154(b) by 882 days.

(21) Appl. No.: 12/198,079

(22) Filed: Aug. 25, 2008

(65) Prior Publication Data

US 2009/0062960 A1 Mar. 5, 2009

Related U.S. Application Data

(60) Provisional application No. 60/969,124, filed on Aug. 30, 2007.

(51) Int. Cl.
*G05B 19/04* (2006.01)
*G05B 19/18* (2006.01)

(52) U.S. Cl. ...................................... 700/254
(58) Field of Classification Search .................. 701/218, 701/258; 700/254
See application file for complete search history.

(56) References Cited

U.S. PATENT DOCUMENTS

| | | | |
|---|---|---|---|
| 5,740,062 A | 4/1998 | Berken et al. | |
| 5,915,915 A * | 6/1999 | Allen et al. | 414/744.1 |
| 5,917,601 A * | 6/1999 | Shimazaki et al. | 356/622 |
| 6,198,976 B1 | 3/2001 | Sundar et al. | |
| 6,392,810 B1 * | 5/2002 | Tanaka | 359/622 |
| 6,493,652 B1 | 12/2002 | Ohlenbusch et al. | |
| 6,556,887 B2 | 4/2003 | Freeman et al. | |
| 6,591,160 B2 | 7/2003 | Hine et al. | |
| 6,591,161 B2 | 7/2003 | Yoo et al. | |
| 6,629,053 B1 * | 9/2003 | Mooring | 702/94 |
| 6,697,517 B1 * | 2/2004 | Hunter | 382/149 |
| 6,819,938 B2 | 11/2004 | Sahota et al. | |

(Continued)

OTHER PUBLICATIONS

Cyperoptics, "WaferSense Auto Teaching System Theory of Operation", www.cyberopticssemi.com, (2006), 2 pages.

(Continued)

*Primary Examiner* — Mary Cheung
*Assistant Examiner* — Michael D Lang
(74) *Attorney, Agent, or Firm* — Blakely, Sokoloff, Taylor & Zafman LLP (57) ABSTRACT

Described herein is a method and system for performing calibrations on robotic components. In one embodiment, a method for performing robotic calibrations includes manually calibrating a center of a robot blade aligned with respect to a target. The method further includes recording a first positional value of the center of the robot blade aligned with respect to a camera. The method further includes automatically determining a second positional value of the center of the robot blade aligned with respect to the camera. The method further includes automatically recalibrating the robot blade based on an offset between the second positional value and the first positional value exceeding a tolerance offset from the first positional value.

20 Claims, 6 Drawing Sheets

U.S. PATENT DOCUMENTS

| | | | |
|---|---|---|---|
| 7,085,622 B2 | 8/2006 | Sadighi et al. | |
| 7,151,609 B2 | 12/2006 | Chalmers et al. | |
| 7,205,742 B2 | 4/2007 | Adachi et al. | |
| 7,233,841 B2 | 6/2007 | Sadighi et al. | |
| 2002/0100053 A1* | 7/2002 | Nguyen et al. | 725/105 |
| 2003/0002452 A1* | 1/2003 | Sahota | 370/318 |
| 2003/0014157 A1* | 1/2003 | Freeman et al. | 700/218 |
| 2003/0198376 A1* | 10/2003 | Sadighi et al. | 382/153 |
| 2004/0199291 A1* | 10/2004 | Freeman et al. | 700/258 |
| 2005/0096794 A1* | 5/2005 | Yim et al. | 700/258 |
| 2005/0102064 A1 | 5/2005 | Donoso et al. | |
| 2006/0164657 A1* | 7/2006 | Chalmers et al. | 356/630 |
| 2007/0106306 A1* | 5/2007 | Bodduluri et al. | 606/133 |
| 2010/0024186 A1* | 2/2010 | Bailey, III | 29/402.04 |

OTHER PUBLICATIONS

PCT, International Search Report and Written Opinion for PCT International Appln. No. PCT/US2008/10262, mailed Nov. 13, 2008 (8 pages).

PCT, International Preliminary Report on Patentability for PCT International Appln. No. PCT/US2008/10262, mailed Mar. 2, 2010 (5 pages).

PCT, International Search Report and Written Opinion for PCT International Appln. No. PCT/US2008/10240, mailed Nov. 21, 2008 (8 pages).

PCT, International Preliminary Report on Patentability for PCT International Appln. No. PCT/US2008/10240, mailed Mar. 2, 2010 (5 pages).

\* cited by examiner

METHOD AND SYSTEM FOR ROBOT CALIBRATIONS WITH A CAMERA

RELATED APPLICATIONS

This application claims the priority benefit of U.S. Provisional Patent Application No. 60/969,124, filed on Aug. 30, 2007 and entitled, "METHOD AND APPARATUS FOR ROBOT CALIBRATION WITH A CAMERA," which is incorporated herein by reference.

TECHNICAL FIELD

Embodiments of the present invention relate to robot calibration, and more specifically to using a camera for robot calibrations.

BACKGROUND

Many industries employ sophisticated manufacturing equipment that includes multiple sensors, controls, and robotic components, each of which may be carefully monitored during processing to ensure product quality. The robotic components require calibrations to accurately define preset positions of the robot system's mechanisms to ensure that the system functions properly. By calibrating the mechanical mechanisms of the robot, proper handoff of objects can be established between the robot and manufacturing equipment components (e.g., loading station, auxiliary chambers, process chambers). Robot calibrations are required for various reasons including after initial installation, after servicing a component, preventive maintenance, restarting or recalibrating the manufacturing equipment, and any other time that the robot's absolute positioning may have changed.

For some manufacturing equipment (e.g., semiconductor fabrication equipment, automotive manufacturing equipment) it is expensive and time consuming to completely shut down the equipment for the time necessary to perform the calibrations. Conventional methods of performing calibrations generally require completely or partially shutting down the equipment. For example, calibrations for robotic components of semiconductor processing equipment is generally performed by taking the equipment off-line from normal manufacturing operations. A robot that needs to be calibrating for transferring wafers to and from a processing chamber requires taking the processing chamber off-line (e.g., removing process gases, altering pressure, voltages, magnetic field, etc), opening the processing chamber and manually performing calibrations. Typically, maintenance personally align a pin or jig into a component of the processing chamber and then manually perform calibrations between the robot handling system and the processing chamber. After calibrations have been completed, the pin or jig is physically removed, and then the lid of the processing chamber is closed. Manufacturing personnel will then perform qualifications on the processing chamber prior to returning the chamber on-line.

Other prior approaches have attempted to minimize the time and expensive of taking manufacturing equipment off-line by using a disc shaped similar to a wafer such that the robot can load and unload the disc into various types of manufacturing equipment. However, this disc requires camera technology for performing the calibrations between the robot and various types of manufacturing equipment. The camera technology must be taught to align to various types of targets found in the manufacturing equipment creating additional complexity and expensive in terms of time, cost, engineering and/or maintenance resources for performing the robot calibrations.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and system for performing calibrations on robotic components. In one embodiment, a method for performing robotic calibrations includes manually calibrating a center of a robot blade aligned with respect to a target. The method further includes recording a first positional value of the center of the robot blade aligned with respect to a camera. The method further includes automatically determining a second positional value of the center of the robot blade aligned with respect to the camera. The method further includes automatically recalibrating the robot blade based on an offset between the second positional value and the first positional value exceeding a tolerance offset from the first positional value. In one embodiment, the recalibration of the robot blade is determined with respect to a process chamber having a lid in a closed position.

In contrast to prior approaches previously discussed, opening of the process chamber is avoided during the recalibration process which eliminates particle entry into the process chamber. Machine down time and labor hours during the recalibration process are significantly reduced compared to the prior approaches that require manual calibrations with the process chamber opened. In one embodiment, camera positions are fixed outside of the process chamber thus enabling the same recalibration process for various types of manufacturing machines having different process parameters (e.g., temperature, processes gases, pressure). Furthermore, during the recalibration process the positions of the robots will be ensured to the same degree of accuracy as during the calibration process because the same center of the robot blade is used for the recalibration.

The following description provides details of a process system that monitors processes run on manufacturing devices. In one embodiment, the process system is for use in the manufacturing of electronic devices (e.g., semiconductors, substrates, liquid crystal displays). Manufacturing such devices generally requires dozens of manufacturing steps involving different types of manufacturing processes. For example, etching, sputtering, and chemical vapor deposition are three different types of processes, each of which is performed on the same machine or alternatively on different types of machines.

Figure 1:
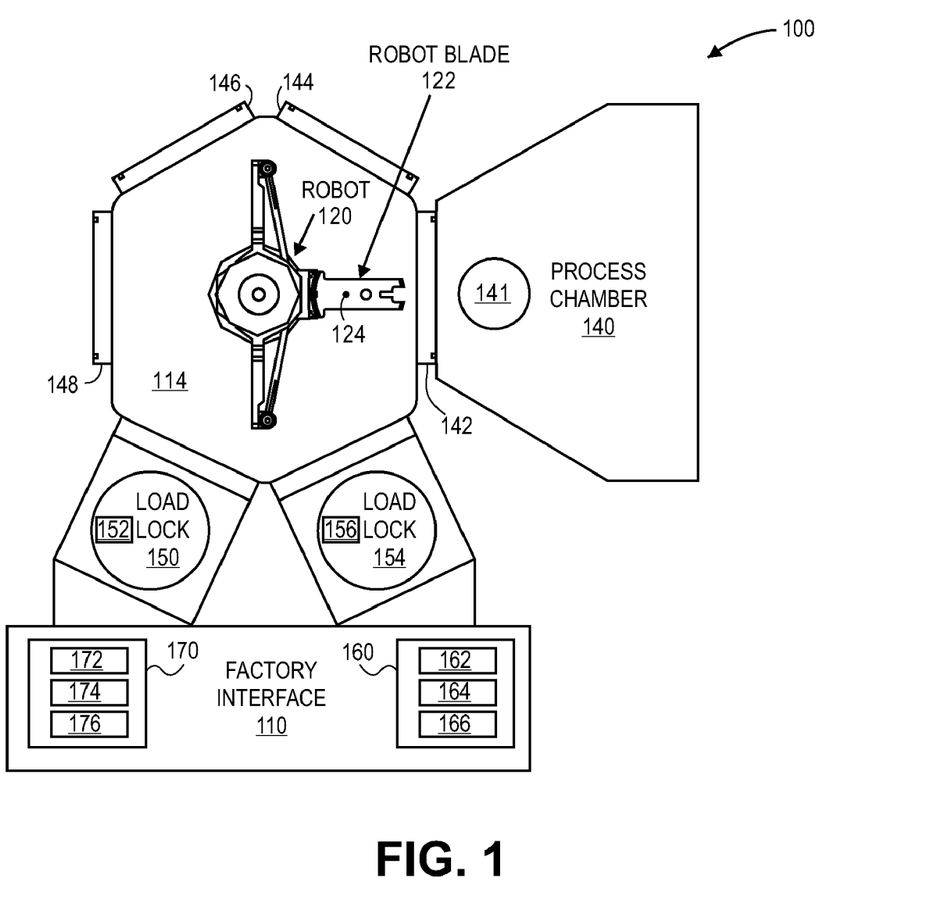
FIG. 1 illustrates one embodiment of a manufacturing machine with cameras positioned on load lock stations.

FIG. 1 illustrates one embodiment of a manufacturing machine with cameras positioned on a transfer chamber. The manufacturing machine or process system 100 includes a factory interface 100 having a system controller 160 and a robot controller 170. The system controller 160 includes a processing unit 162, software 164, and memory 166 for controlling operations of the manufacturing machine 100. The robot controller 170 includes a processing unit 172, software 174, and memory 176 for controlling operations of a robot 120.

In one embodiment, the manufacturing machine (e.g., cluster tool) 100 includes a load lock station 150 having a camera station 152, a load lock station 154 having a camera station 156, a transfer chamber 114, process chamber 140, and chamber ports 142, 144, 146, and 148. The chamber port 142 interfaces between the transfer chamber 114 and the process chamber 140. The remaining chamber ports are capable of interfacing between the transfer chamber 114 and other process chambers (not shown) in certain embodiments.

The transfer chamber 114 includes the robot 120 and a robot blade 122. The robot 120 transfers devices (e.g., wafers, substrates, reticles) between the load lock stations 150 and 154 and the process chamber 140 and/or any other process chambers. The robot 120 may need calibrating for a variety of reasons including preventive maintenance (e.g., robot, process chamber), restarting the manufacturing equipment 100, replacing various components of the manufacturing equipment 100, and system faults (e.g., a broken device). These calibrations are needed in a timely and accurate manner in order for manufacturing to ship products faster with fewer product performance issues.

In one embodiment, the robot 120 is manually calibrated by aligning a center 124 of the robot blade 122 with respect to a target 141. If the target 141 is located in a process chamber, then maintenance personnel will purge the chamber, open the chamber, place a pin or identification target in the chamber, and then align a center of the robot blade with the target. The process chamber then can be closed and return to processing conditions. Next, a first positional value of the center 124 of the robot blade 122 is recorded by aligning the center 124 of the robot blade 122 with respect to a camera station attached to a load lock station, a chamber port, and/or the transfer chamber 114. A positional value or coordinate is recorded such as (x, y) coordinate value or a (radius, theta) value for the robot 120 with theta being measured in degrees around an imaginary z-axis of the robot 120.

If the robot then needs or is scheduled for recalibrating as discussed above, then recalibration can occur automatically without opening the transfer chamber 114 or the process chamber 140. A second positional value of the center 124 of the robot blade 122 is determined by automatically aligning the center 124 of the robot blade 122 with respect to the same camera station that was previously aligned to the robot blade 122. In other words, the robot is trained to return to the first positional value in alignment with the camera station. The camera station captures an image of the center of the robot blade in alignment with a center of the camera station. This image is sent via a wired or wireless link to a processing unit such as processing 162 or 172. The processing unit 162 or 172 executes image processing software in order to determine the second positional value of the center of the robot blade and offset between the first and second positional values.

The image from the camera system should be compatible with the system controller 160 and can be viewed dynamically on a monitor linked to the system controller 160. The image processing software which provides the offset values should also be compatible with the system controller 160. The offset values can be directly used for robot teaching.

The robot blade 122 can be recalibrated based on the offset between the second positional value and the first positional value exceeding a tolerance offset from the first positional value. The robot blade 122 will need to be recalibrated if the offset between the first and second positional values exceeds a predetermined tolerance offset permitted for safe operation of the robot blade 122.

The recalibrating discussed above occurs with respect to a process chamber having a closed lid in contrast to prior approaches. The recalibrating procedures occur with respect to a camera station located outside of the processing chamber. The camera station may be located on the transfer chamber 114, chamber ports 142, 144.146, 148, or load lock stations 150 and 154 as illustrated in FIGS. 1 and 2 with the camera station having a view inside of the transfer chamber, chamber ports, and/or load station in order to record positional values of the robot blade 122 with respect to the camera station.

The processing chamber may contain processing gases, temperatures, magnetic fields, and pressures at a similar level compared to actual on-line processing conditions. In one embodiment, the processing chamber is performing manufacturing processes during the recalibration of the robot blade 122. The recalibrating is simple, cost-effective, requires less maintenance time, and results in less down time of the manufacturing machines 100.

In one embodiment, each of the manufacturing machines 100 is a machine for the manufacture of electronic devices, such as etchers, chemical vapor deposition (CVD) furnaces, photolithography devices, implanters, etc. Alternatively, the manufacturing machines 100 may be of a type for manufacturing other products (e.g., automobiles). In one embodiment, each of the manufacturing machines 100 is of a single type. Alternatively, the manufacturing machines 100 may include multiple different types of equipment, each of which may run different processes.

Figure 2:
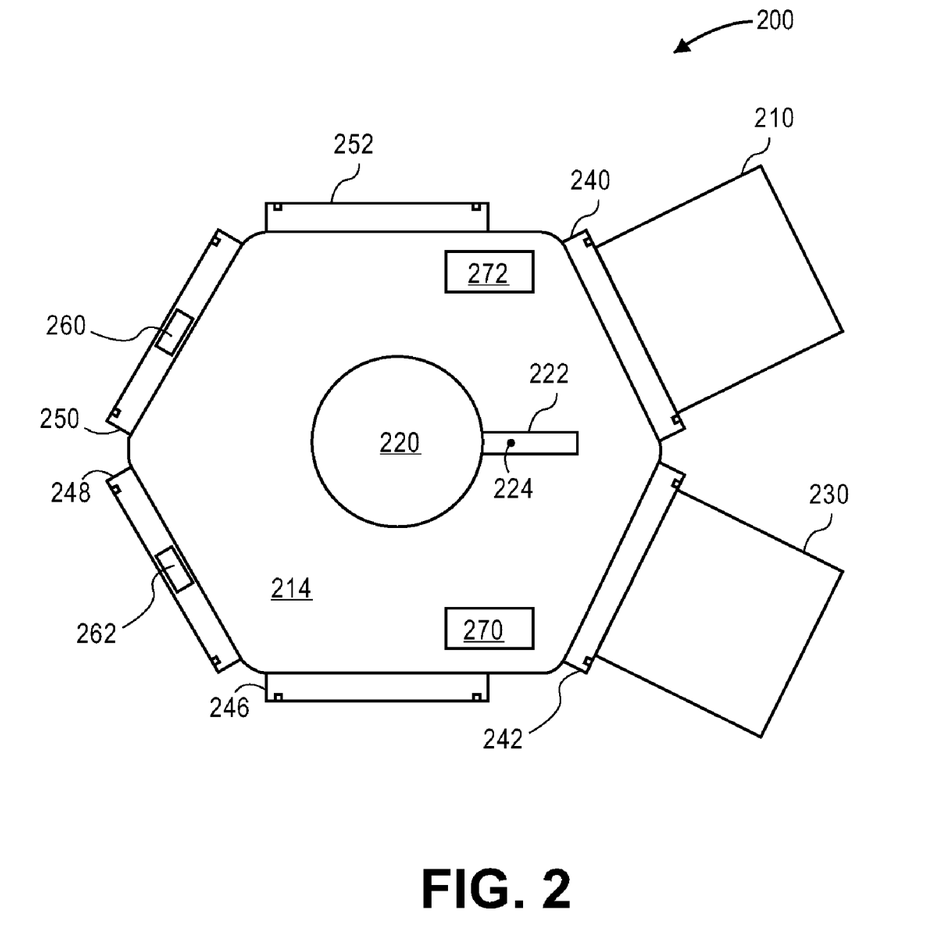
FIG. 2 illustrates one embodiment of a manufacturing machine with various camera positions.

FIG. 2 illustrates one embodiment of a manufacturing machine with various camera positions. The manufacturing machine or process system 200 includes a factory interface 270 having system controller 280 and robot controller 282, load stations 210 and 230, a transfer chamber 214, and chamber ports 246, 248, 250, and 252 capable of interfacing to process chambers (not shown). The transfer chamber 214 includes a robot 220, and a robot blade 222 having a center 224.

The calibrating and recalibrating discussed above in connection with FIG. 1 occurs in a similar manner for FIG. 2. However, the cameras 152 and 156 located on top of the load lock stations 150 and 154, respectively, in FIG. 1 have been replaced with cameras 260 and 262 located on top of the chamber ports 248 and 250 in FIG. 2. Additionally, cameras 272 and 270 are coupled to the transfer chamber 214. In one embodiment, the calibrating and recalibrating procedures occur automatically with respect to one or more cameras 260, 262, 270, and 272. Additional cameras can be mounted on to the transfer chamber 214 in line with a process chamber orientation in order to improve robot repeatability and decrease positional errors for alignment between the robot 220 and a target located in a process chamber.

Figure 3:
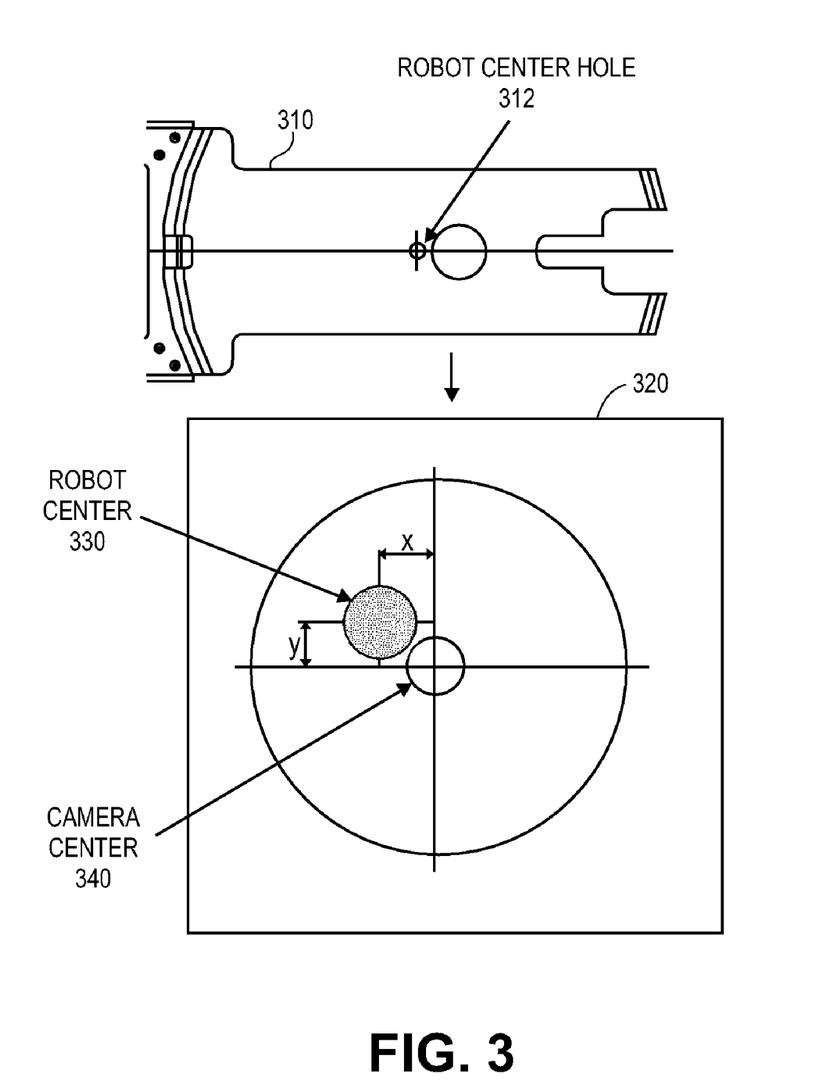
FIG. 3 illustrates one embodiment of a robot blade being aligned with a camera station.

FIG. 3 illustrates one embodiment of a robot blade being aligned with a camera station. A robot blade 310 includes a center hole 312 that can be aligned with a center 340 of a camera station. The camera station needs to be compatible with a clean room for a semiconductor fabrication application. The camera station needs to be able to capture a diameter of the center hole 312 from a certain distance. For example, the certain distance may be 2 to 6 inches for a center hole 312 having a diameter of 0.127 inches. In one embodiment, the camera station views the center hole 312 through a clear window glass and needs to capture an image in varying conditions of illuminations by having auto focusing and lighting system. The shape and size of the camera station should be compact in order to fit on a chamber port, load lock, or transfer chamber as illustrated in FIGS. 1 and 2. In one embodiment, the camera station is located in a fixed position on a chamber port, load lock, or transfer chamber. In one embodiment, the camera station captures an image that provides offset values having an accuracy of +/−0.002 inches.

As previously discussed, if a robot needs or is scheduled for recalibrating, then recalibration can occur automatically without opening a transfer chamber or a process chamber. First, calibration occurs with the center hole 312 being aligned with respect to the camera center 340 with this position being recorded. Then, re-calibration automatically occurs with the robot being trained to return to the previous position in alignment with the camera station. At this time, the camera station captures an image 320 having a robot center hole 330 and camera center 340. This image is sent via a wired or wireless link to a processing unit that executes image processing software in order to determine an offset such as x and y coordinates between the center hole 330 and camera center 340.

The robot blade can be recalibrated based on this offset exceeding a tolerance offset from the camera center 340. The robot blade 310 will need to be recalibrated if this offset exceeds a predetermined tolerance offset permitted for safe operation of the robot blade 310.

Figure 4:
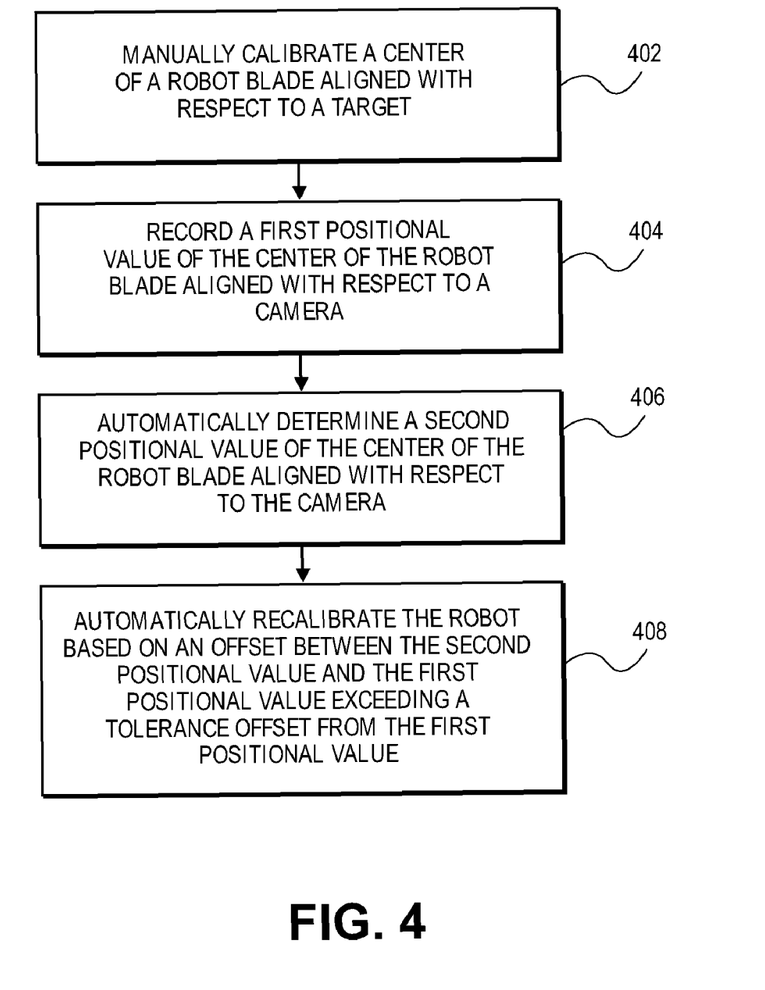
FIG. 4 illustrates one embodiment of a robot blade being positioned into a process chamber.

FIG. 4 illustrates a flow diagram of one embodiment for a method of providing robot calibrations. In one embodiment, a method for performing robotic calibrations includes calibrating a center of a robot blade aligned with respect to a target at block 402. The method further includes recording a first positional value of the center of the robot blade aligned with respect to a camera at block 404. The method further includes automatically determining a second positional value of the center of the robot blade aligned with respect to the camera at block 406. The method further includes automatically recalibrating the robot blade based on an offset between the second positional value and the first positional value exceeding a tolerance offset from the first positional value at block 408.

If a first recalibration results in the offset exceeding the tolerance offset, then the recalibration process may repeat. In this case, a third positional value of the center of the robot blade is automatically determined with the center being aligned with respect to the camera. The robot blade is recalibrating based on an offset between the third positional value and the first positional value exceeding a tolerance offset from the first positional value at block 412.

Figure 5:
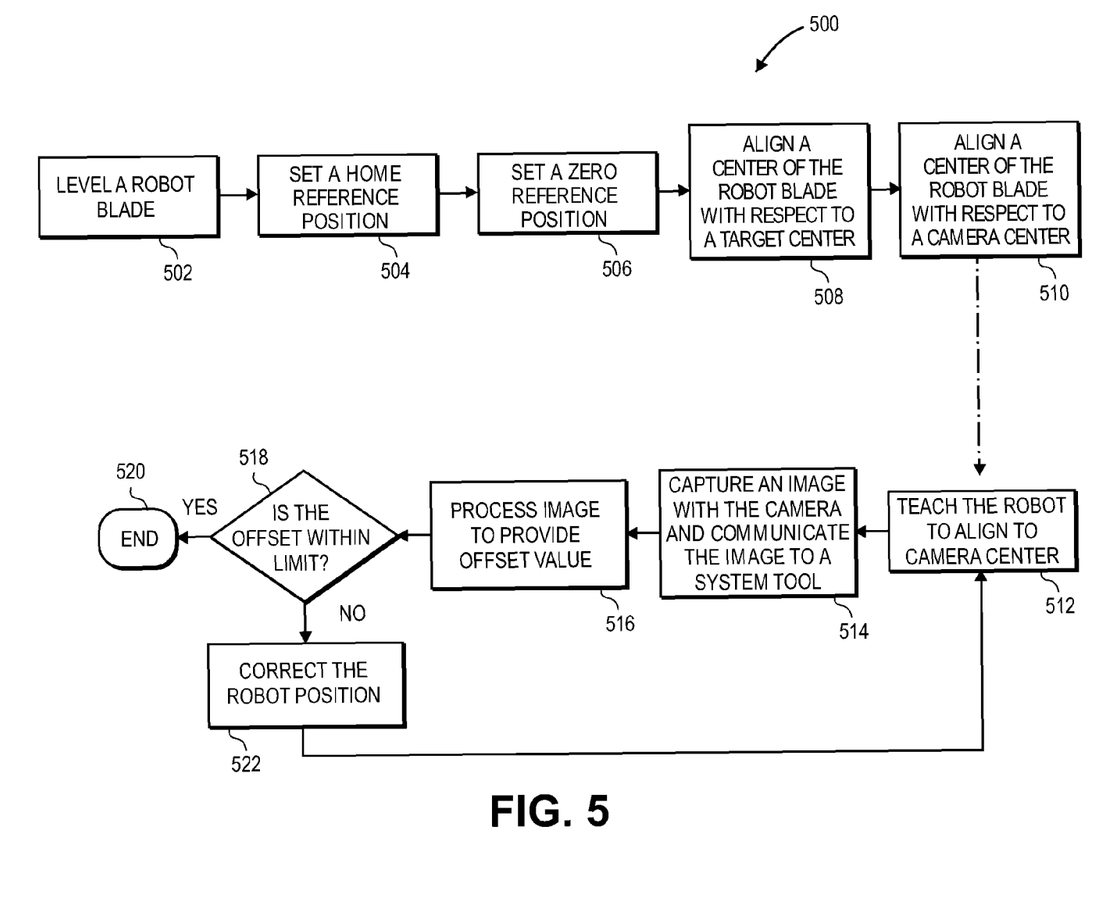
FIG. 5 illustrates a flow diagram of an embodiment for providing robot calibrations.

FIG. 5 illustrates a detailed flow diagram of one embodiment for a method of providing robot calibrations. In one embodiment, a method for performing robotic calibrations includes leveling a robot blade with reference to a slit valve of a transfer chamber or load lock station at block 502. The method further includes setting the robot blade in a home reference position at block 504. In one embodiment, the home position is defined as a starting position that can be repeatedly achieved using a sensor internal to the robot. Retract home sensors can be mounted on an inner shaft of the robot. These sensors are optical sensors that sense when robot flags associated with blades of the robot are inside the transfer chamber such that the robot and blades are safe to rotate. The home position is unique to each robot. The method further includes setting a zero reference point (e.g., a zero position) at block 506. In one embodiment, a zero position (e.g., zero position of robot blade with respect to a transfer chamber) is a reference point referenced by all other reference points.

For the robot zero calibration a pie shaped piece that fits in the buffer, or transfer chamber may be used. The pie is inserted into its correct position with respect to a transfer chamber having an alignment marker (e.g., pin). If the part of the pie closest to the robot motor moves in a side to side direction then the pie is calibrated. Alternatively, a camera station may be used for zero position calibrations of the robot. For example, a center hole of the robot blade can be aligned with respect to a center of a camera station attached to the transfer chamber.

The method further includes positioning a center of the robot blade with respect to a center of a target at block 508. The robot is calibrated by recording a first positional value (e.g., (x, y) coordinates or (R, theta) coordinates) of the center of the robot blade aligned with respect to the target. In one embodiment, the target is a wafer chuck located in a processing chamber. The method further includes positioned the center of the robot blade with respect to a center of a camera station at block 510. A first positional value of the center of the robot blade aligned with respect to the center of the camera station is recorded at block 510. The operations of blocks 502, 504, 506, 508, and 510 are used for an initial setting and/or calibration during tool startup time. Subsequently, the robot may require a recalibration process described below in operations 512, 514, 516, 518, 520, and 522.

The method further includes teaching the robot to align the center of the robot blade to the center of the camera station (camera center) at block 512 based on the previous alignment to the camera center at block 510. The method further includes capturing an image of the center of the robot blade aligned with respect to the camera center and communicating this image via a wired or wireless link to a system tool (e.g., system controller 160) at block 514. The method further includes processing this image with image processing software to provide an offset value between the camera center and the center of the robot blade aligned with the camera station at block 516. The image processing software is executed by a processing unit located in the system tool. In one embodiment, the image processing software directly calculates the offset value from the image. In another embodiment, the image processing software determines a second positional value of the center of the robot blade and then determines the offset between the second positional value and the first position value (camera center).

The method further includes determining whether the offset is within a predetermined limit at block 518. The predetermined limit establishes a maximum offset between the center of the robot blade and camera center for safe, proper operation of the robot. The method further includes terminating the recalibration at block 520 if the calculated offset is within the predetermined limit at block 518. Otherwise, the robot is recalibrated at block 522 by correcting the robot position. In this case, the recalibration process repeats starting at block 512.

Figure 6:
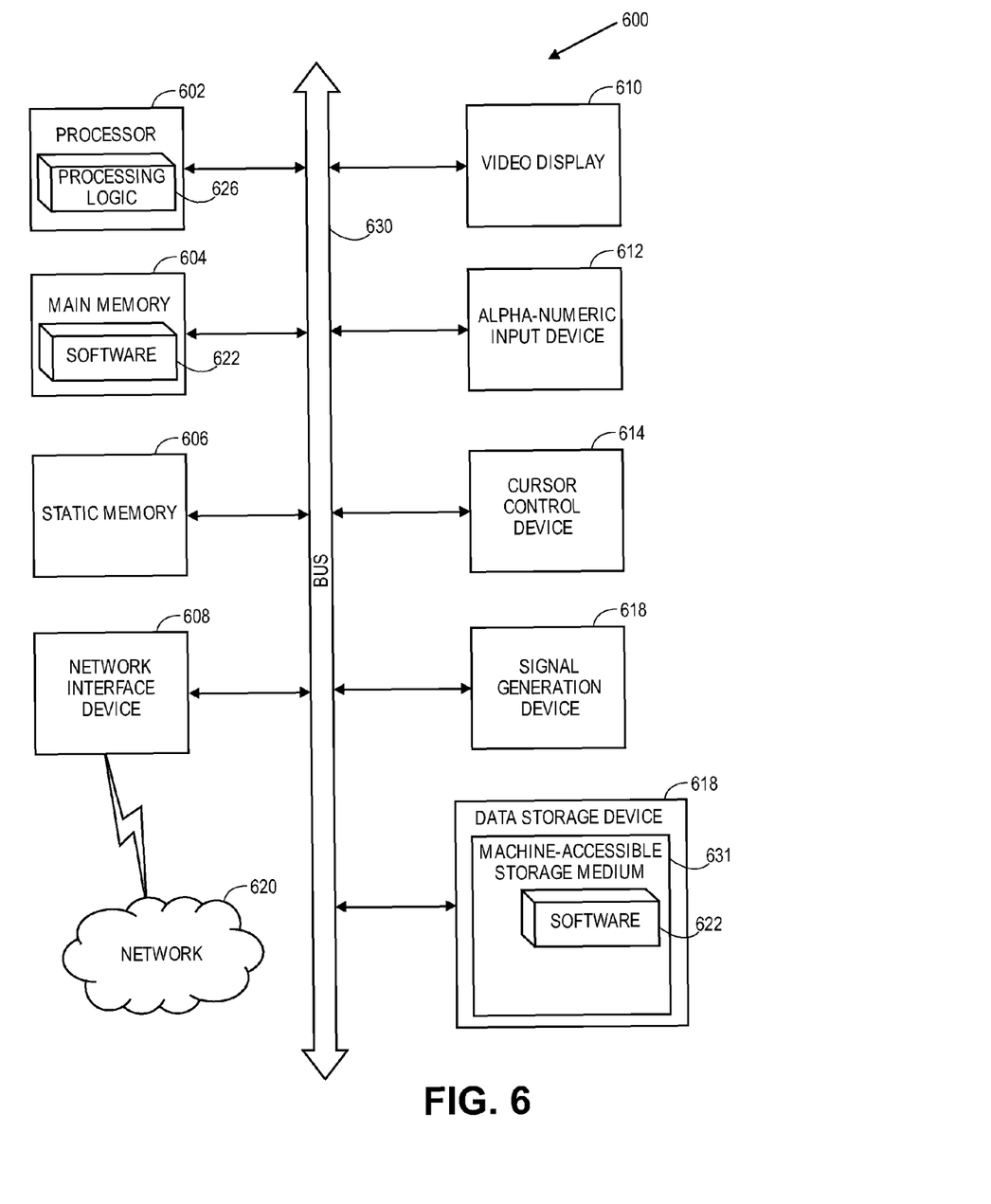
FIG. 6 illustrates a diagrammatic representation of a machine in the exemplary form of a computer system within which a set of instructions, for causing the machine to perform any one or more of the methodologies discussed herein, may be executed.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device (processor) 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 631 on which is stored one or more sets of instructions (e.g., software 622) embodying any one or more of the methodologies or functions described herein. The software 622 may also reside, completely or at least partially, within the main memory 604 and/or within the processor 602 during execution thereof by the computer system 600, the main memory 604 and the processor 602 also constituting machine-accessible storage media. The software 622 may further be transmitted or received over a network 620 via the network interface device 608.

The machine-accessible storage medium 631 may also be used to store data structure sets that define user identifying states and user preferences that define user profiles. Data structure sets and user profiles may also be stored in other sections of computer system 600, such as static memory 606.

While the machine-accessible storage medium 631 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

In the present description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.).

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method to recalibrate a robot, comprising:
   manually calibrating a center of a robot blade aligned with respect to a target, which is located in a process chamber;
   recording a first positional value of the center of the robot blade aligned with respect to a camera station based on the camera station capturing an image of the center of the robot blade in alignment with a center of the camera station during the calibration of the robot, wherein the camera station is remotely located from the robot blade while capturing the image;
   automatically determining a second positional value of the center of the robot blade aligned with respect to the camera station during a recalibration of the robot; and
   automatically recalibrating the robot blade based on an offset between the second positional value and the first positional value exceeding a tolerance offset from the first positional value, wherein the recalibration of the robot occurs automatically without opening the process chamber.

2. The method of claim 1, further comprising:
   automatically determining a third positional value of the center of the robot blade aligned with respect to the camera station; and
   automatically recalibrating the robot blade based on an offset between the third positional value and the first positional value exceeding a tolerance offset from the first positional value.

3. The method of claim 1, wherein the target is a substrate support.

4. The method of claim 3, wherein a lid of the process chamber is closed during recalibration of the robot blade.

5. The method of claim 2, wherein a lid of a process chamber is closed during recalibration of the robot blade.

6. The method of claim 1, wherein automatically determining the second positional value of the center of the robot blade further comprises:
   training the robot to align the center of the robot blade with the camera station.

7. The method of claim 6, wherein automatically determining the second positional value of the center of the robot blade further comprises:
   capturing an image of the center of the robot blade aligned with respect to the camera station; and
   sending the image to a processing unit to automatically determining the second positional value of the center of the robot blade.

8. A machine-accessible medium including data that, when accessed by a machine, cause the machine to perform a method comprising:
   manually calibrating a center of a robot blade aligned with respect to a target, which is located in a process chamber;
   recording a first positional value of the center of the robot blade aligned with respect to a camera station based on the camera station capturing an image of the center of the robot blade in alignment with a center of the camera station during the calibration of the robot, wherein the camera station is remotely located from the robot blade while capturing the image;
   automatically determining a second positional value of the center of the robot blade aligned with respect to the camera station during a recalibration of the robot; and
   automatically recalibrating the robot blade based on an offset between the second positional value and the first positional value exceeding a tolerance offset from the first positional value, wherein the recalibration of the robot occurs automatically without opening the process chamber.

9. The machine-accessible medium of claim 8, the method further comprising:
   automatically recording a third positional value of the center of the robot blade aligned with respect to the camera station; and
   automatically recalibrating the robot blade based on an offset between the third positional value and the first positional value exceeding a tolerance offset from the first positional value.

10. The machine-accessible medium of claim 8, wherein the target is a substrate support.

11. The machine-accessible medium of claim 8, wherein automatically determining the second positional value of the center of the robot blade further comprises:
    training the robot to align the center of the robot blade with the camera station.

12. The machine-accessible medium of claim 11, wherein automatically determining the second positional value of the center of the robot blade further comprises:
    capturing an image of the center of the robot blade aligned with respect to the camera station; and
    sending the image to a processing unit to automatically determining the second positional value of the center of the robot blade.

13. A manufacturing machine, comprising:
    a plurality of process chambers;
    a transfer chamber having a robot to transfer devices between the transfer chamber and the processing chambers;
    a load station coupled to the transfer chamber with the robot capable of transferring the devices between the load station and transfer chamber;
    a chamber port between the transfer chamber and a processing chamber;
    a camera station attached to the transfer chamber, the load station, or the chamber port while capturing images; and
    a processing unit to control operations of the robot, wherein the robot is manually calibrated with respect to a processing chamber having a lid in an open position and then subsequently the robot is automatically recalibrated with respect to the processing chamber having the lid in a closed position based on images captured by the camera station.

14. The machine of claim 13, wherein the processing unit records a first positional value of the center of the robot blade aligned with respect to a center of the camera station.

15. The machine of claim 14, wherein the processing unit automatically recalibrates the robot by automatically determining a second positional value of the center of the robot blade aligned with respect to the camera station based on an offset between the second positional value and the first positional value exceeding a tolerance offset from the first positional value.

16. The machine of claim 15, wherein the processing unit subsequently automatically recalibrates the robot by recording a third positional value of the center of the robot blade aligned with respect to the camera station based on an offset between the third positional value and the first positional value exceeding a tolerance offset from the first positional value.

17. The machine of claim 13, wherein the robot is manually calibrated with respect to a target located in the processing chamber.

18. The machine of claim 16, wherein the camera station is attached to the outside of the transfer chamber with a view inside of the transfer chamber for recording the first, second, and third positional values of the robot in the transfer chamber.

19. The machine of claim 16, wherein the camera station is attached to the outside of the load station with a view inside of the load station for recording the first, second, and third positional values of the robot in the load station.

20. The machine of claim 16, wherein the camera station is attached to the outside of the chamber port with a view inside of the chamber port for recording the first, second, and third positional values of the robot in the chamber port.

* * * * *